United States Patent
Vollath et al.

(10) Patent No.: US 9,116,231 B2
(45) Date of Patent: Aug. 25, 2015

(54) INDICATING QUALITY OF GNSS POSITION FIXES

(75) Inventors: Ulrich Vollath, Superior, CO (US); Sidharth Nair, Phoenix, AZ (US); Jesus Michael Martinez, Broomfield, CO (US); Greg Price, Nelson (NZ); Glenn Waterland, Westminster, CO (US); Mark Gibson, Portland, OR (US)

(73) Assignee: Trimble Navigation Limited, Sunnyvale, CA (US)

(*) Notice: Subject to any disclaimer, the term of this patent is extended or adjusted under 35 U.S.C. 154(b) by 531 days.

(21) Appl. No.: 13/403,224

(22) Filed: Feb. 23, 2012

(65) Prior Publication Data

US 2012/0229332 A1    Sep. 13, 2012

Related U.S. Application Data

(60) Provisional application No. 61/451,983, filed on Mar. 11, 2011.

(51) Int. Cl.
| | |
|---|---|
| *G01S 19/20* | (2010.01) |
| *G01S 19/23* | (2010.01) |
| *G01S 19/41* | (2010.01) |
| *G01S 19/43* | (2010.01) |

(52) U.S. Cl.
CPC ............... *G01S 19/23* (2013.01); *G01S 19/41* (2013.01); *G01S 19/43* (2013.01)

(58) Field of Classification Search
CPC ......... G01S 19/20; G01S 19/08; G01S 19/23; G01S 19/41; G01S 19/43
USPC ........................................ 342/357.58, 357.45
See application file for complete search history.

(56) References Cited

U.S. PATENT DOCUMENTS

| | | | |
|---|---|---|---|
| 5,311,194 | A | 5/1994 | Brown |
| 5,323,322 | A | 6/1994 | Mueller et al. |
| 5,828,336 | A | 10/1998 | Yunck et al. |
| 5,893,044 | A | 4/1999 | King et al. |
| 6,295,021 | B1 | 9/2001 | Lichten et al. |

(Continued)

FOREIGN PATENT DOCUMENTS

| | | |
|---|---|---|
| EP | 1 862 809 A1 | 12/2007 |
| EP | 2 037 291 A1 | 3/2009 |

(Continued)

OTHER PUBLICATIONS

International Search Report and Written Opinion of the International Searching Authority mailed May 31, 2011 in International Application No. PCT/US2010/002565 (six pages).

(Continued)

*Primary Examiner* — Harry Liu
(74) *Attorney, Agent, or Firm* — Kilpatrick Townsend & Stockton LLP

(57) ABSTRACT

Methods and apparatus are provided for reporting quality of GNSS position fixes. A desired quality mode selection is obtained. Position fixes with respective precision estimates and satellite tracking information are obtained. For each of a plurality of position fixes a current positioning quality is determined, based on the precision estimates and satellite tracking information and quality mode selection. Current positioning quality is reported. The quality selection can be a preference of availability over accuracy, or accuracy over availability, or a balance of availability and accuracy.

17 Claims, 7 Drawing Sheets

(56) References Cited

U.S. PATENT DOCUMENTS

| | | |
|---|---|---|
| 6,324,473 B1 | 11/2001 | Eschenbach |
| 6,662,107 B2 | 12/2003 | Gronemeyer |
| 7,117,417 B2 | 10/2006 | Sharpe et al. |
| 7,292,185 B2 | 11/2007 | Whitehead et al. |
| 7,312,747 B2 | 12/2007 | Vollath et al. |
| 7,432,853 B2 | 10/2008 | Vollath |
| 7,498,979 B2 | 3/2009 | Liu et al. |
| 7,538,721 B2 | 5/2009 | Vollath et al. |
| 7,541,975 B2 | 6/2009 | Sever et al. |
| 7,576,690 B2 | 8/2009 | Vollath |
| 7,589,668 B2 | 9/2009 | Vollath et al. |
| 7,692,578 B2 | 4/2010 | Vollath et al. |
| 7,746,272 B2 | 6/2010 | Vollath |
| 7,755,542 B2 | 7/2010 | Chen et al. |
| 7,768,449 B2 | 8/2010 | Gaal et al. |
| 7,868,820 B2 | 1/2011 | Kolb |
| 7,961,143 B2 | 6/2011 | Dai et al. |
| 7,982,667 B2 | 7/2011 | Vollath et al. |
| 8,018,377 B2 | 9/2011 | Collins |
| 8,035,552 B2 | 10/2011 | Dai et al. |
| 8,130,143 B2 | 3/2012 | Liu et al. |
| 8,237,609 B2 | 8/2012 | Talbot et al. |
| 8,242,953 B2 | 8/2012 | Dai et al. |
| 8,260,551 B2 | 9/2012 | Janky et al. |
| 8,334,807 B2 | 12/2012 | Gaal et al. |
| 8,368,590 B2 | 2/2013 | Vollath et al. |
| 8,368,591 B2 | 2/2013 | Talbot et al. |
| 8,400,351 B2 | 3/2013 | Talbot et al. |
| 8,542,146 B2 | 9/2013 | Vollath |
| 8,558,736 B2 | 10/2013 | Talbot et al. |
| 8,587,475 B2 | 11/2013 | Leandro |
| 8,614,642 B2 | 12/2013 | Talbot et al. |
| 8,694,250 B2 | 4/2014 | Talbot et al. |
| 8,704,708 B2 | 4/2014 | Vollath |
| 8,704,709 B2 | 4/2014 | Vollath et al. |
| 2002/0177465 A1* | 11/2002 | Robinett ............... 455/552 |
| 2003/0016147 A1 | 1/2003 | Evans |
| 2003/0048218 A1 | 3/2003 | Milnes et al. |
| 2005/0055160 A1 | 3/2005 | King |
| 2005/0064878 A1 | 3/2005 | O'Meagher |
| 2005/0101248 A1 | 5/2005 | Vollath |
| 2007/0063894 A1 | 3/2007 | Yu |
| 2007/0109985 A1* | 5/2007 | Wiedeman et al. ......... 370/316 |
| 2007/0200753 A1 | 8/2007 | Fuchs et al. |
| 2008/0036654 A1 | 2/2008 | Hansen et al. |
| 2008/0192242 A1 | 8/2008 | Nichols |
| 2008/0204312 A1 | 8/2008 | Euler |
| 2008/0238768 A1 | 10/2008 | Nasworthy |
| 2008/0258966 A1 | 10/2008 | Sugimoto et al. |
| 2009/0027264 A1 | 1/2009 | Chen et al. |
| 2009/0098880 A1 | 4/2009 | Lindquist |
| 2009/0109090 A1 | 4/2009 | Vollath |
| 2009/0135057 A1 | 5/2009 | Vollath et al. |
| 2009/0140914 A1 | 6/2009 | Talbot et al. |
| 2009/0179792 A1 | 7/2009 | Remondi |
| 2009/0179793 A1 | 7/2009 | Remondi |
| 2009/0184869 A1 | 7/2009 | Talbot et al. |
| 2009/0224969 A1 | 9/2009 | Kolb |
| 2009/0237298 A1 | 9/2009 | Vollath et al. |
| 2009/0322600 A1 | 12/2009 | Whitehead et al. |
| 2010/0033370 A1 | 2/2010 | Lopez et al. |
| 2010/0141515 A1 | 6/2010 | Doucet et al. |
| 2010/0156709 A1 | 6/2010 | Zhang et al. |
| 2010/0177806 A1 | 7/2010 | Normark et al. |
| 2010/0214162 A1 | 8/2010 | Talbot et al. |
| 2010/0220005 A1* | 9/2010 | Kosolobov et al. ...... 342/357.12 |
| 2010/0245168 A1 | 9/2010 | Rollet et al. |
| 2010/0253575 A1 | 10/2010 | Vollath |
| 2011/0071759 A1* | 3/2011 | Pande et al. .................. 701/213 |
| 2011/0110414 A1* | 5/2011 | Papadogiannis et al. ..... 375/227 |
| 2011/0140959 A1 | 6/2011 | Vollath |
| 2011/0148698 A1 | 6/2011 | Vollath |
| 2011/0156949 A1 | 6/2011 | Vollath et al. |
| 2011/0187590 A1 | 8/2011 | Leandro |
| 2011/0267228 A1 | 11/2011 | Talbot et al. |
| 2011/0279314 A1 | 11/2011 | Talbot et al. |
| 2011/0285587 A1 | 11/2011 | Vollath et al. |
| 2012/0026038 A1 | 2/2012 | Vollath |
| 2012/0092213 A1 | 4/2012 | Chen |
| 2012/0119944 A1 | 5/2012 | Chen |
| 2012/0154210 A1 | 6/2012 | Landau et al. |
| 2012/0154214 A1 | 6/2012 | Leandro |
| 2012/0154215 A1 | 6/2012 | Vollath et al. |
| 2012/0162007 A1 | 6/2012 | Leandro et al. |
| 2012/0163419 A1 | 6/2012 | Seeger |
| 2012/0229332 A1 | 9/2012 | Vollath et al. |
| 2012/0286991 A1 | 11/2012 | Chen et al. |
| 2012/0293367 A1 | 11/2012 | Chen et al. |
| 2012/0306694 A1 | 12/2012 | Chen et al. |
| 2013/0044026 A1 | 2/2013 | Chen et al. |
| 2013/0335266 A1 | 12/2013 | Vollath et al. |
| 2014/0002300 A1 | 1/2014 | Leandro et al. |
| 2014/0015712 A1 | 1/2014 | Leandro et al. |

FOREIGN PATENT DOCUMENTS

| | | |
|---|---|---|
| WO | 03/038464 A2 | 5/2003 |
| WO | 2005/043186 A2 | 5/2005 |
| WO | 2007/082038 A1 | 7/2007 |
| WO | 2010/096159 A2 | 8/2010 |

OTHER PUBLICATIONS

International Search Report and Written Opinion of the International Searching Authority mailed May 31, 2011 in International Application No. PCT/US2010/002564 (seven pages).

International Search Report and Written Opinion of the International Searching Authority mailed May 30, 2011 in International Application No. PCT/US2010/002563 (six pages).

International Search Report and Written Opinion of the International Searching Authority mailed May 26, 2011 in International Application No. PCT/US2010/002562 (six pages).

International Search Report and Written Opinion of the International Searching Authority mailed May 31, 2011 in International Application No. PCT/US2010/002581 (six pages).

International Search Report and Written Opinion of the International Searching Authority mailed Sep. 27, 2011 in International Application No. PCT/US2011/024733 (ten pages).

International Search Report and Written Opinion of the International Searching Authority mailed Oct. 6, 2011 in International Application No. PCT/US2011/024743 (ten pages).

International Search Report and Written Opinion of the International Searching Authority mailed Sep. 26, 2011 in International Application No. PCT/US2011/024763 (ten pages).

International Search Report and Written Opinion of the International Searching Authority mailed Oct. 12, 2012 in International Application No. PCT/US2012/029694 (fourteen pages).

International Search Report and Written Opinion of the International Searching Authority mailed Oct. 16, 2012 in International Application No. PCT/US2012/028670 (eight pages).

International Search Report and Written Opinion of the International Searching Authority mailed Sep. 5, 2012 in International Application No. PCT/US2012/028671 (eight pages).

S. Banville et al., "Satellite and Receiver Phase Bias Calibration for Undifferenced Ambiguity Resolution," Proceedings of the 2008 National Technical Meeting of the Institute of Navigation, San Diego, CA, Jan. 2008, pp. 711-719.

Y. Bar-Sever et al., "A new model for GPS yaw attitude," Journal of Geodesy, vol. 70, No. 11, Nov. 1996, pp. 714-723 (abstract only).

G. Bierman, Factorization Methods for Discrete Sequential Estimation, Academic Press, Inc., 1977, 129 pp.

S. Bisnath et al., "Precise Orbit Determination of Low Earth Orbiters with GPS Point Positioning," Proceedings of the 2001 National Technical Meeting of The Institute of Navigation, Long Beach, CA, Jan. 2001, pp. 725-733.

P. Collins, "Isolating and Estimating Undifferenced GPS Integer Ambiguities," Proceedings of the 2008 National Technical Meeting of The Institute of Navigation, San Diego, CA, Jan. 2008, pp. 720-732.

(56) References Cited

OTHER PUBLICATIONS

P. Collins et al., "Precise Point Positioning with Ambiguity Resolution using the Decoupled Clock Model," Proceedings of the 21st International Technical Meeting of the Satellite Division of The Institute of Navigation (ION GNSS 2008), Savannah, GA, Sep. 2008, pp. 1315-1322.

P. Collins et al., "Accessing and Processing Real-Time GPS Corrections for Precise Point Positioning . . . Some User Considerations," Proceedings of the 18th International Technical Meeting of the Satellite Division of The Institute of Navigation (ION GNSS 2005), Long Beach, CA, Sep. 2005, pp. 1483-1491.

Y. Gao et al., "A New Method for Carrier-Phase-Based Precise Point Positioning", Navigation, Journal of The Institute of Navigation, vol. 49, No. 2, Summer 2002, pp. 109-116.

"GNSS Solutions: Precise Point Positioning and Its Challenges, Aided-GNSS and Signal Tracking," Inside GNSS, Nov./Dec. 2006, pp. 16-21.

M. Gabor et al., "Satellite-Satellite Single-Difference Phase Bias Calibration as Applied to Ambiguity Resolution", Navigation, Journal of The Institute of Navigation, vol. 49, No. 4, Winter 2002-2003, pp. 223-247.

M. Ge et al., "Resolution of GPS carrier-phase ambiguities in Precise Point Positioning (PPP) with daily observations," Journal of Geodesy, Jul. 2008, vol. 82, Issue 7, pp. 389-399.

A. Hauschild et al., "Real-time Clock Estimation for Precise Orbit Determination of LEO-Satellites," Proceedings of the 21st International Technical Meeting of the Satellite Division of The Institute of Navigation (ION GNSS 2008), Savannah, GA, Sep. 2008, pp. 581-589.

P. Heroux et al., "GPS Precise Point Positioning Using IGS Orbit Products," Phys. Chem. Earth (A), vol. 26, No. 6-8. pp. 573-578, 2001.

P. Heroux et al., "GPS Precise Point Positioning with a Difference," presented at Geomatics '95, Ottawa, Ontario, Canada, Jun. 13-15, 1995, 11 pp.

S. Hutsell, "Relating the hadamard variance to MCS Kalman filter clock estimation," in Proceedings of the 27th Annual Precise Time and Time Interval (PTTI) Applications and Planning Meeting, p. 293, San Diego, Calif, USA, Dec. 1995.

IERS Conventions (2003), International Earth Rotation and Reference Systems Service, IERS Technical Note No. 32, 127 pp.

"IGS Product Table—updated for 2009," from http://igsch.jpl.nasa.gov/components/prods.html on Aug. 19, 2009, three pages.

J. Kouba, "A simplified yaw-attitude model for eclipsing GPS satellites," GPS Solutions, Jan. 2009, vol. 13, Issue 1, pp. 1-12.

J. Kouba, "A guide to using International GPS Service (IGS) Products," International GPS Service, Feb. 2003, 31 pp.

J. Kouba et al., "Precise Point Positioning Using IGS Orbit and Clock Products," GPS Solutions, Oct. 2001, vol. 5, Issue 2, pp. 12-28.

D. Lapucha et al., "Comparison of the Two Alternate Methods of Wide Area Carrier Phase Positioning," Proceedings of the 17th International Technical Meeting of the Satellite Division of The Institute of Navigation (ION GNSS 2004), Long Beach, CA, Sep. 2004, pp. 1864-1871.

D. Laurichesse et al., "Real Time Zero-difference Ambiguities Fixing and Absolute RTK," Proceedings of the 2008 National Technical Meeting of The Institute of Navigation, San Diego, CA, Jan. 2008, pp. 747-755.

D. Laurichesse et al., "Integer Ambiguity Resolution on Undifferenced GPS Phase Measurements and its Application to PPP," Proceedings of the 20th International Technical Meeting of the Satellite Division of The Institute of Navigation (ION GNSS 2007), Fort Worth, TX, Sep. 2007, pp. 839-848.

R. Leandro et al., "Wide Area Based Precise Point Positioning," Proceedings of the 19th International Technical Meeting of the Satellite Division of The Institute of Navigation (ION GNSS 2006), Fort Worth, TX, Sep. 2006, pp. 2272-2278.

R. Leandro et al., "UNB Neutral Atmosphere Models: Development and Performance," Proceedings of the 2006 National Technical Meeting of The Institute of Navigation, Monterey, CA, Jan. 2006, pp. 564-573.

S. Lo et al., "GNSS Album: Images and Spectral Signature of the New GNSS Signals," Inside GNSS, May/Jun. 2006, pp. 46-56.

W. Melbourne, "The case for ranging in GPS based geodetic systems," Proceedings 1st International Symposium on Precise Positioning with the Global Positioning system, U.S. Department of Commerce, Rockville, Maryland, Apr. 15-19, vol. 1, pp. 373-386.

L. Mervart et al., "Precise Point Positioning with Ambiguity Resolution in Real-Time," Proceedings of the 21st International Technical Meeting of the Satellite Division of The Institute of Navigation (ION GNSS 2008), Savannah, GA, Sep. 2008, pp. 397-405.

Y. Mireault et al., "Online Precise Point Positioning," GPS World, Sep. 2008, pp. 59-64.

A. Niell, "Global mapping functions for the atmosphere delay at radio wavelengths," Journal of Geophysical Research, vol. 101, No. B2, pp. 3227-3246, Feb. 10, 1996.

S. Schaer, [IGSMAIL-287]: Monitoring (P1-C1) code biases, IGS Electronic Mail Message No. 2827,May 9, 2000, two pages.

G. Seeber, Satellite Geodesy, 2d. Ed., 2003, p. 31.

P. Tetrault et al., "CSRS-PPP: An Internet Service for GPS User Access to the Canadian Spatial Reference Frame," Geomatica, vol. 59, No. 1, 2005, pp. 17-28.

A. Van Dierendonck et al., "Relationship Between Allan Variances and Kalman Filter Parameters," Proceedings of the 16th Annual Precise Time and Time Interval (PTTI) Applications and Planning Meeting, NASA Goddard Space Flight Center, Nov. 1984, pp. 273-293.

S. Verhagen, "The GNSS integer ambiguities: estimation and validation" PhD dissertation, Delft University of Technology, Publications on Geodesy, vol. 58, Netherlands Geodetic Commission, Delft, 2005, 196 pp.

G. Wubbena, "Software Developments for Geodetic Positioning with GPS Using TI 4100 Code and Carrier Measurements," in Goad C.C. (ed), Proc. of First Int. Sym. on Precise Position. with GPS Rockville, Maryland, pp. 403-412, (1985).

J. Zumberge et al., "Precise point positioning for the efficient and robust analysis of GPS data from large networks," Journal of Geophysical Research: Solid Earth, vol. 102, Issue B3, pp. 5005-5017, Mar. 10, 1997.

\* cited by examiner

| 2 sigma | Autonomous P2P | DGPS/VBS P2P | Omni XP Absolute | Omni HP Absolute | RTK Absolute | VRS Absolute |
|---|---|---|---|---|---|---|
| GOLD (Blue indicator) | <12 inch | <8 inch | <=5 inch | <=4 inch | <=1 inch | <=2 inch |
| SILVER (Yelow indicator) | <24 inch | <12 inch | <8 inch | <8 inch | <=3 inch | <=4 inch |
| BRONZE (Red indicator) | >=24 inch | >=12 inch | >=8 inch | >=8 inch | >=3 inch | >4inch |

| SETTING/CONTROL | | Engage Display Indication | | | |
|---|---|---|---|---|---|
| Run On: | Gold (Blue indicator) | ⊙ | ⚠ | ⚠ | ⚠ |
| Notification | | Engaged | Warning | Warning | Drop Out |
| Run On: | Silver (Yellow indicator) | ⊙ | ⊙ | ⚠ | ⚠ |
| Notification | | Engaged | Engaged | Warning | Drop Out |
| Run On: | Bronze (Red indicator) | ⊙ | ⊙ | ⊙ | ⚠ |
| Notification | | Engaged | Engaged | Engaged | Drop Out |

Horizontal Precision (1) $\sqrt{(\sigma_e^2 + \sigma_n^2)}$ (2) semi-major axis of horizontal error ellipse Vertical Precision $\sqrt{\sigma_u^2}$

INDICATING QUALITY OF GNSS POSITION FIXES

RELATED APPLICATIONS

The following are related hereto and incorporated herein in their entirety by this reference: U.S. Provisional Application for Patent No. 61/277,184 filed 19 Sep. 2009; International Patent Application PCT/US2009/059552 filed 5 Oct. 2009; U.S. Provisional Application for Patent No. 61/195,276 filed 6 Oct. 2008; International Patent Application PCT/US/2009/004471 filed 5 Aug. 2009; International Patent Application PCT/US/2009/004473 filed 5 Aug. 2009; International Patent Application PCT/US/2009/004474 filed 5 Aug. 2009; International Patent Application PCT/US/2009/004472 filed 5 Aug. 2009; International Patent Application PCT/US/2009/004476 filed 5 Aug. 2009; U.S. Provisional Application for Patent No. 61/189,382 filed 19 Aug. 2008; U.S. patent application Ser. No. 12/224,451 filed 26 Aug. 2008, United States Patent Application Publication U.S. 2009/0027625 A1; International Patent Application PCT/US07/05874 filed 7 Mar. 2007, International Publication No. WO 2008/008099 A2; U.S. patent application Ser. No. 11/988,763 filed 14 Jan. 2008, United States Patent Application Publication U.S. 2009/0224969 A1; International Patent Application No. PCT/US/2006/034433 filed 5 Sep. 2006, International Publication No. WO 2007/032947 A1; U.S. Pat. No. 7,432,853 granted 7 Oct. 2008; International Patent Application No. PCT/US2004/035263 filed 22 Oct. 2004 and International Publication Number WO 2005/045463 A1; U.S. Pat. No. 6,862,526 granted 1 Mar. 2005; U.S. Provisional Application for Patent No. 61/396,676, filed 30 May 2010; U.S. Provisional Application for Patent No. 61/337,980 filed 14 Feb. 2010; International Application PCT US11/24733 filed 14 Feb. 2011; International Application PCT US11/24743 filed 14 Feb. 2011; and International Application PCT US11/24763 filed 14 Feb. 2011.

BACKGROUND

1. Field of the Invention

The present invention relates to GNSS positioning, and particularly to indicating quality of GNSS position fixes.

2. Prior Art

Lightbar guidance systems provide a visual display to assist an operator in guiding a vehicle, such as an agricultural machine, over a desired course. Examples of such systems include the EZ-Guide 250 and EZ-Guide 500 Lightbar Guidance Systems available commercially from Trimble Navigation Limited (Trimble). These can be combined with an automated steering system such as the Trimble EZ-Steer system.

The visual display includes a number of operational elements, indicating for example whether the vehicle is on or to the side of the intended path, swath lines, swath numbers, vehicle position and heading relative to the current swath, spray coverage, overlap, and/or a menu of possible user selections.

However, available systems offer limited ability to perform guided operations when GNSS satellite positioning quality is reduced.

Improved systems are desired which provide additional information and/or allow the user better control of the system.

SUMMARY

Methods and apparatus in accordance with some embodiments of the invention provide for user selection of a positioning quality mode, and for reporting of positioning quality based on the selected positioning quality mode. In accordance with some embodiments, the selection of positioning quality mode allows for vehicle operation at times of reduced GNSS satellite positioning quality.

DETAILED DESCRIPTION

Methods and apparatus in accordance with some embodiments of the invention provide for user selection of a positioning quality mode, and for reporting of positioning quality based on the selected positioning quality mode. In accordance with some embodiments, the selection of positioning quality mode allows for vehicle operation at times of reduced GNSS satellite positioning quality.

In accordance with some embodiments, a quality mode option enables a user to select between favoring accuracy, favoring availability, and balancing accuracy and availability.

In accordance with some embodiments, the quality mode selection controls one or more parameters affecting positioning accuracy and/or availability, such as satellite elevation masks, C/No (Carrier-to-Noise ratio) masks, DOP (Dilution of Precision) masks, and any other controls to provide additional accuracy or availability.

In accordance with some embodiments, the selection balance accuracy and availability is a default selection which can be changed by entry of an alternate selection.

In accordance with some embodiments, a status indicator reports which of the quality mode options is currently selected.

Some embodiments provide a positioning quality indicator. The user can select the desired level of GNSS positioning quality. This can enable extended operating hours by running the system when GNSS satellites are less available and possibly providing lower positioning quality. Alternatively, the user can select the best level of quality to achieve maximum positioning accuracy. Maximum positioning accuracy also depends on the type of GNSS correction data in use.

Figures 1, 2:
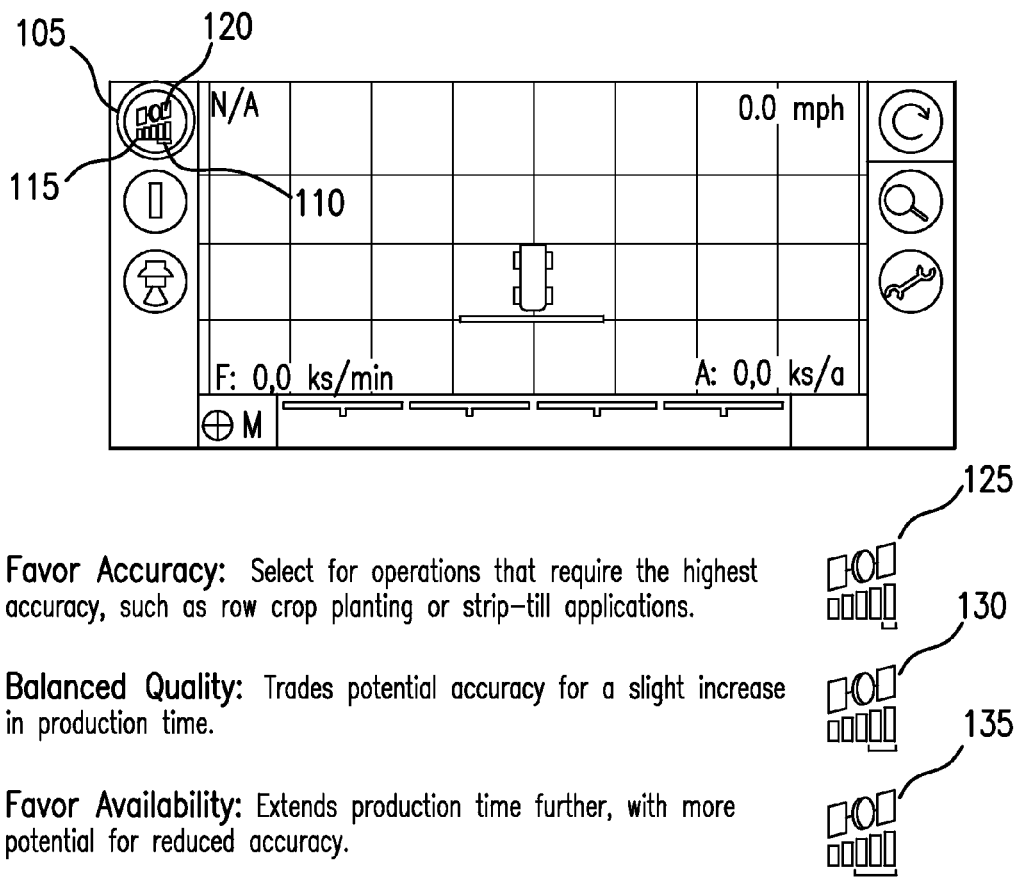
FIG. 1 shows an image of a positioning display in accordance with some embodiments of the invention.
FIG. 2 shows an example of positioning quality indicator characteristics in accordance with some embodiments of the invention.

FIG. 1 shows a screen display 100 in accordance with some embodiments. An example of a quality indicator is shown at 105. Quality indicator 105 includes a bracket 110 indicating the selected positioning quality level, a set of signal bars 115 indicating GNSS signal quality, and an icon 120 indicating current positioning quality.

In this example, bracket 110 underscores one, two or three of the signal bars 115.

When the selected position quality favors accuracy, bracket 110 underscores one signal bar as shown at 125. Operations requiring highest accuracy are, for example, row crop planting or strip-till operation. The highest accuracy mode offers best pass-to-pass and year-to-year repeatability.

When the selected position quality favors a balance between accuracy and availability, bracket 110 underscores two signal bars as shown at 130. Selecting balanced quality trades potential accuracy for an increase in production time.

When the selected position quality favors availability, bracket 110 underscores three signal bars as shown at 135. Favoring availability extends production time further, with more potential for reduced accuracy. This option can sometimes trade some accuracy for more availability or runtime. This option may still achieve the highest level of accuracy for the correction data source in use. For example, when using this option with RTK corrections, the system may use positions that are greater than 1" pass-to-pass accuracy.

The correction data source may be, for example, RTK, SBAS, Omnistar, StarFire, or any other suitable correction data source available now or in the future.

FIG. 2 shows a display scheme 200 for using quality indicator 105 to report position quality in accordance with some embodiments of the invention.

In this example, the configurations of quality indicator 105 are shown in upper row 205 for a position quality selection favoring availability, in middle row 210 for a position quality selection favoring a balance between availability and accuracy, and in lower row 215 for a position quality selection favoring accuracy.

FIG. 2 shows the configurations organized in columns from less accurate to more accurate according to various conditions: (1) no satellites tracked, (2) satellites tracked but no position of any type, (3) some position available but could be wrong source or does not meet the Favor Availability criteria, (4) Favor Availability criteria met, (5) Balanced Quality criteria met, and (6) Favor Accuracy criteria met.

The configuration of quality indicator 105 which is displayed at any given time is determined by which position quality has been selected by the user, and by the criteria which are currently satisfied.

The configurations when the Favor Availability position quality has been selected are in row 205. For condition (1), no quality indicator is provided. For condition (2), the quality indicator shows one signal bar in yellow and shows the satellite icon in yellow. For condition (3), the quality indicator shows two signal bars in yellow and shows the satellite icon in yellow. For condition (4), the quality indicator shows three signal bars in green and shows the satellite icon in green. For condition (5), the quality indicator shows four signal bars in green and shows the satellite icon in green. For condition (6), the quality indicator shows five signal bars in green and shows the satellite icon in green.

The configurations when Balanced position quality has been selected are in row 210. For condition (1), the quality indicator shows no signal bars and shows the satellite icon in red. For condition (2), the quality indicator shows one signal bar in yellow and shows the satellite icon in yellow. For condition (3), the quality indicator shows two signal bars in yellow and shows the satellite icon in yellow. For condition (4), the quality indicator shows three signal bars in yellow and shows the satellite icon in yellow. For condition (5), the quality indicator shows four signal bars in green and shows the satellite icon in green. For condition (6), the quality indicator shows five signal bars in green and shows the satellite icon in green.

The configurations when the Favor Accuracy position quality has been selected are in row 215. For condition (1), the quality indicator shows no signal bars and shows the satellite icon in red. For condition (2), the quality indicator shows one signal bar in yellow and shows the satellite icon in yellow. For condition (3), the quality indicator shows two signal bars in yellow and shows the satellite icon in yellow. For condition (4), the quality indicator shows three signal bars in yellow and shows the satellite icon in yellow. For condition (5), the quality indicator shows four signal bars in yellow and shows the satellite icon in yellow. For condition (6), the quality indicator shows five signal bars in green and shows the satellite icon in green.

Figure 3:
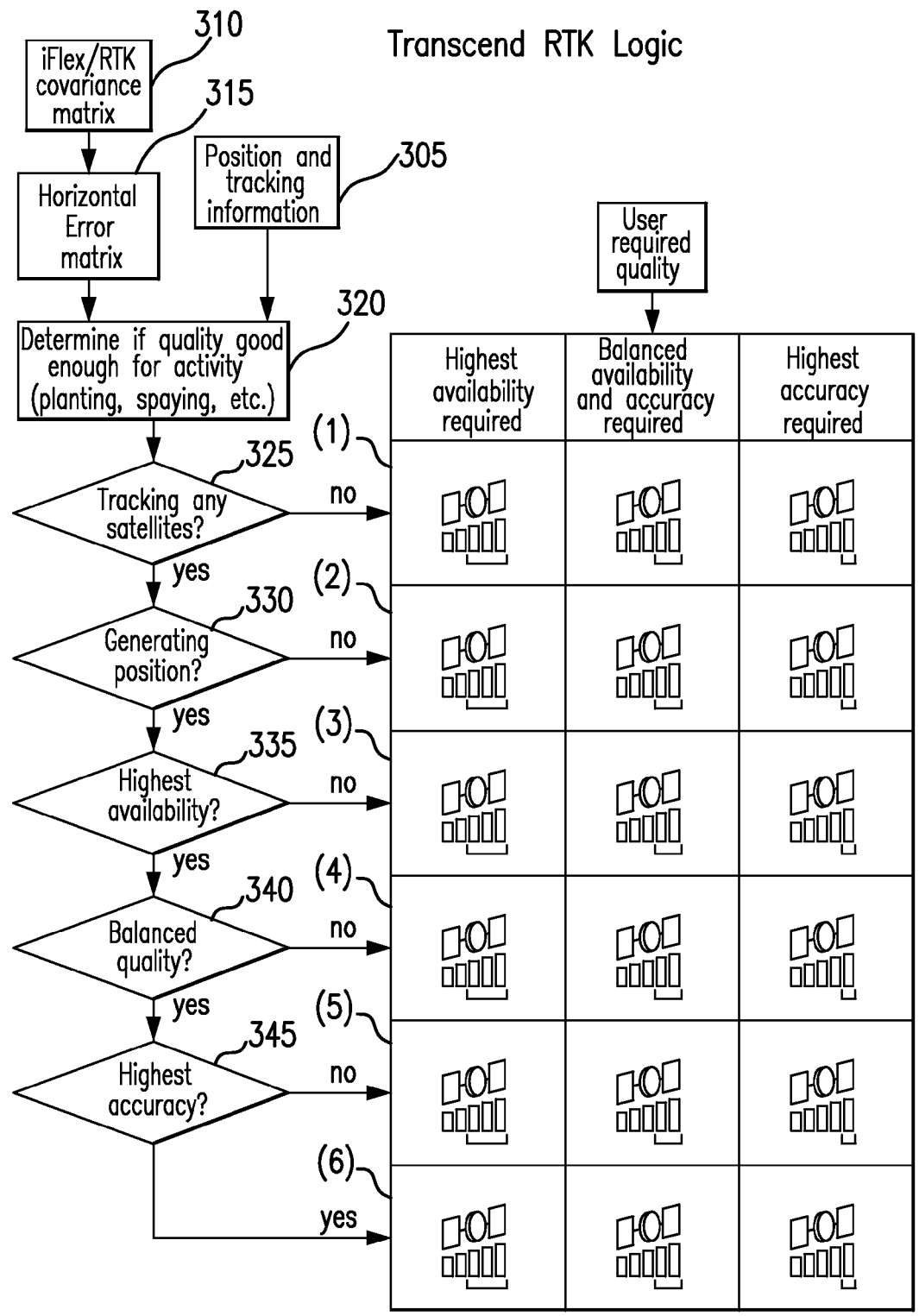
FIG. 3 shows an example of positioning quality indicator logic in accordance with some embodiments of the invention.

FIG. 3 shows an example of a display logic scheme 300 for controlling the quality indicator configurations of FIG. 2. A GNSS receiver (not shown) provides antenna position estimates and satellite tracking information 305 along with data 310 related to precision of the position estimates, such as covariances of parameters estimated with the position estimates.

The covariances are used to determine a measure of position quality 315 such as a horizontal position error estimate, a three-dimensional position error estimate, a vertical position error estimate, or other metric suitable to the application for which the position estimates are to be used.

A process flow 320 determines if position quality is adequate for the intended activity, such as planting or spraying as a series of decision elements. Decision element 325 determines whether satellites are tracked. If no, a quality indicator associated with condition (1) is displayed. If satellites are tracked, decision element 330 determines whether a position estimate is being generated. If no, a quality indicator associated with condition (2) is displayed.

If a position estimate is being generated, decision element 335 determines whether highest availability criteria are met. If no, a quality indicator associated with condition (3) is displayed. If highest availability criteria are met, decision element 340 determines whether balanced quality criteria are met. If no, a quality indicator associated with condition (4) is displayed.

If the balanced quality criteria are met, decision element 345 determines whether highest accuracy criteria are met. If no, a quality indicator associated with condition (5) is displayed. If the highest accuracy criteria are met, a quality indicator associated with condition (6) is displayed.

In each case, the quality indicator displayed depends on the quality mode selected by the user: highest availability, balanced availability and accuracy, or highest accuracy.

Many different graphical depictions can be used to display performance levels. Signal bars are compact and easily integrated with a red/yellow/green satellite depiction of go, warning, no-go conditions.

In accordance with some embodiments, the quality indicator display depends on the quality mode selected by the user, while the associated positioning precision depends on the correction data, if any, used in generating position estimates.

Figures 4, 5:
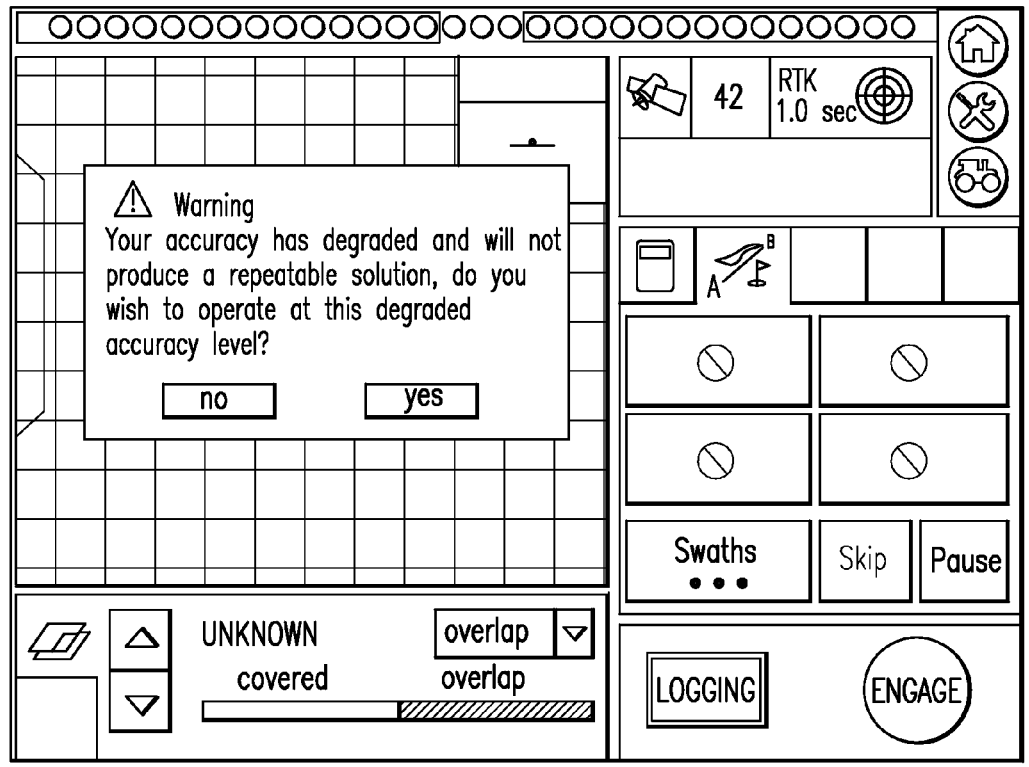
FIG. 4 shows an example of threshold selection in accordance with some embodiments of the invention.
FIG. 5 shows an image of a positioning display with auto mode selection in accordance with some embodiments of the invention.

FIG. 4 shows an example in which the user can select between three quality levels (gold, silver, bronze), each level having an associated 2-sigma positioning accuracy for a given correction data type. The correction data types are, for example: autonomous positioning, differential GPS or virtual base station positioning, Omnistar XP absolute positioning, Omnistart HP absolute positioning, RTK absolute positioning, and Virtual Reference Station absolute positioning. Other correction data types can be used if desired.

In the example of FIG. 4, the user can engage autosteering for a selected accuracy mode. If the positioning quality falls below the criteria for the selected accuracy mode, the autosteering is disabled and the user is notified via a suitable display. The user can then await resumption of positioning quality of the selected accuracy mode, or can select a less demanding accuracy mode and continue operation under the less demanding accuracy mode.

For example, if the user selects Silver RTK, autosteering can be engaged within a +/−3 inch pass-to-pass accuracy. Operation may be better than one inch accuracy and so indicated, thus within the accuracy threshold. If positioning accuracy falls below the threshold associated with the selected positioning mode, the user is presented with an option to continue under a less accurate positioning mode, as in the example of FIG. 5.

Figures 6, 7:
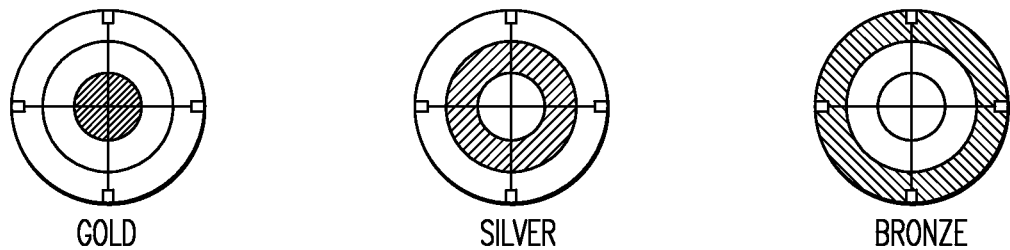
FIG. 6 shows an example of status indicators in accordance with some embodiments of the invention.
FIG. 7 shows an example of status indicator display icons in accordance with some embodiments of the invention.

Positioning quality is reported in some embodiments with a status indicator which indicates a convergence level for a correction data type in use. FIG. 6 shows an example in which the status indicator represents three positioning accuracy modes: gold, silver, bronze.

FIG. 7 is a matrix showing the action taken to control the auto-steering system, depending on which of the positioning accuracy modes is selected by the user. When positioning accuracy is better than the threshold of the selected mode, a symbol indicates the accuracy level (Gold, Silver, Bronze) and the auto-streering system remains in operation ("Engaged"). When positioning accuracy degrades below the threshold of the selected mode, a warning indication is given ("Warning"). When positioning accuracy degrades below the warning level, the auto-steering system is disabled ("Drop Out").

Figure 8:
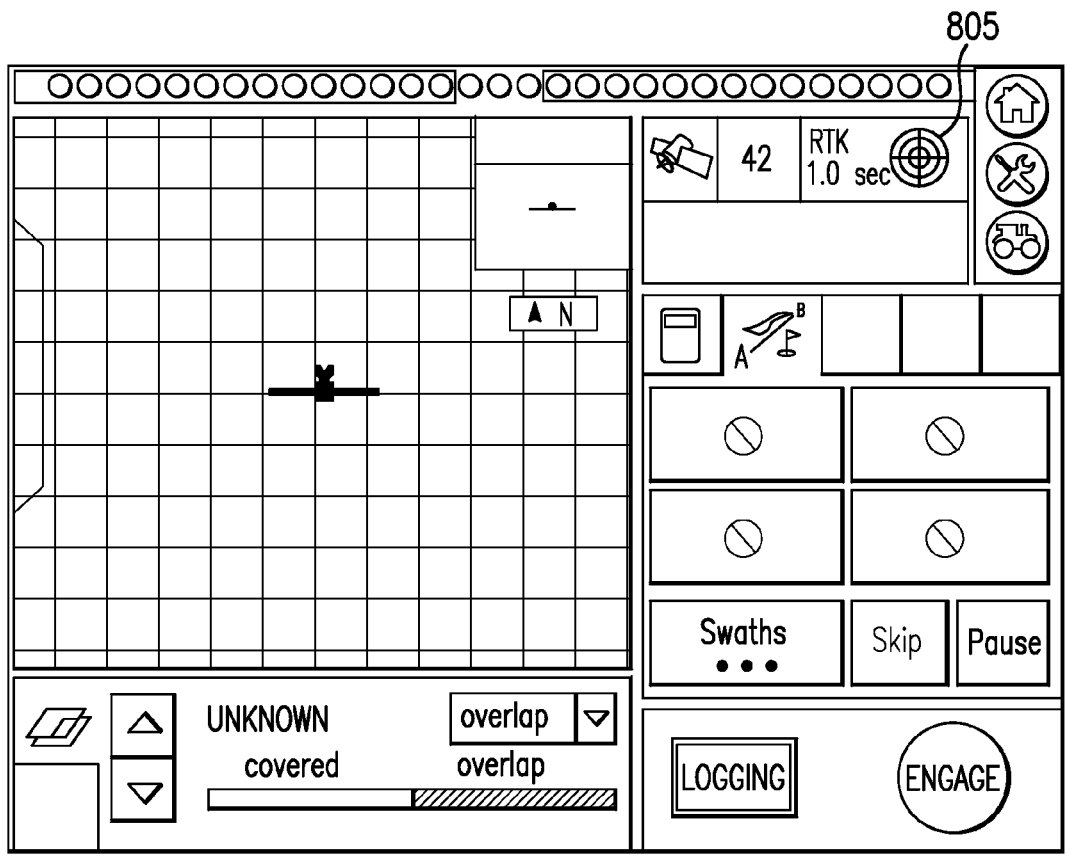
FIG. 8 shows an image of a positioning display with status indicator in accordance with some embodiments of the invention.

FIG. 8 shows a screen display 800 in accordance with some embodiments. In this example a status indicator 805 is present in the upper right corner next to the satellite information. When the positioning accuracy is reduced and the user accepts the reduced accuracy, the corresponding threshold icon (Gold, Silver, Bronze) is displayed.

In some embodiments, the auto-steering system is automatically re-engaged when the positioning accuracy returns to the desired level.

In some embodiments, the positioning accuracy mode selection is automatically set to a level corresponding to a current level of positioning accuracy. For example, automatic mode selection logic determines the mode when Gold level accuracy drops to Silver or Bronze level accuracy or Silver accuracy drops to Bronze level accuracy. The automatic mode selection logic operates for example as follows:

User selects Gold level positioning accuracy;
When current positioning accuracy drops below Gold level threshold, user is invited to approve automatic change to selection of Silver level positioning accuracy;
User approves automatic change and selected positioning accuracy is changed to Silver level;
Accuracy improves to Gold level for a predetermined time (e.g., 60 seconds)
Selected positioning accuracy mode automatically returns to previously selected (e.g., Gold) level.

Positioning quality is in some embodiments based on estimated covariances of parameters used in determining position estimates.

Figure 9:
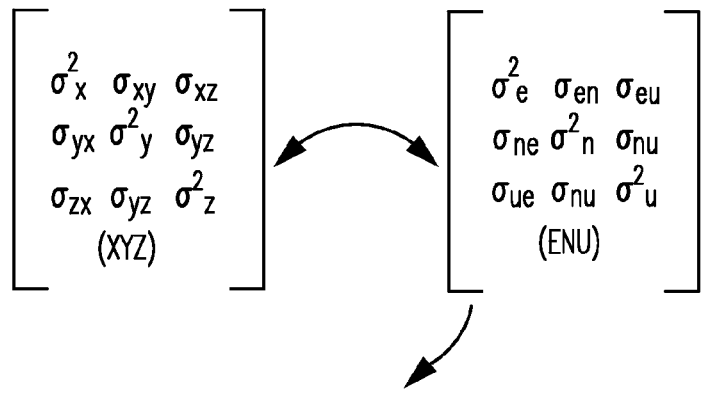
FIG. 9 shows a covariance matrix transformation and precision determination in accordance with some embodiments of the invention.

FIG. 9 shows for example a position covariance matrix from which horizontal precision and/or a vertical precision is estimated. Horizontal precision can be estimated as the square root of the sum of the squares of the East covariance and the North covariance, or as the semi-major axis of a horizontal error ellipse. Vertical precision can be estimated as the square root of the square of the Up covariance. Precisions are typically quoted with a particular confidence level, e.g., 68%, 95%, 99%, etc. Statistics can be scaled to a desired confidence level using an appropriate distribution (e.g., Student-T distribution), assuming the data agrees with the chosen distribution.

Figure 10:
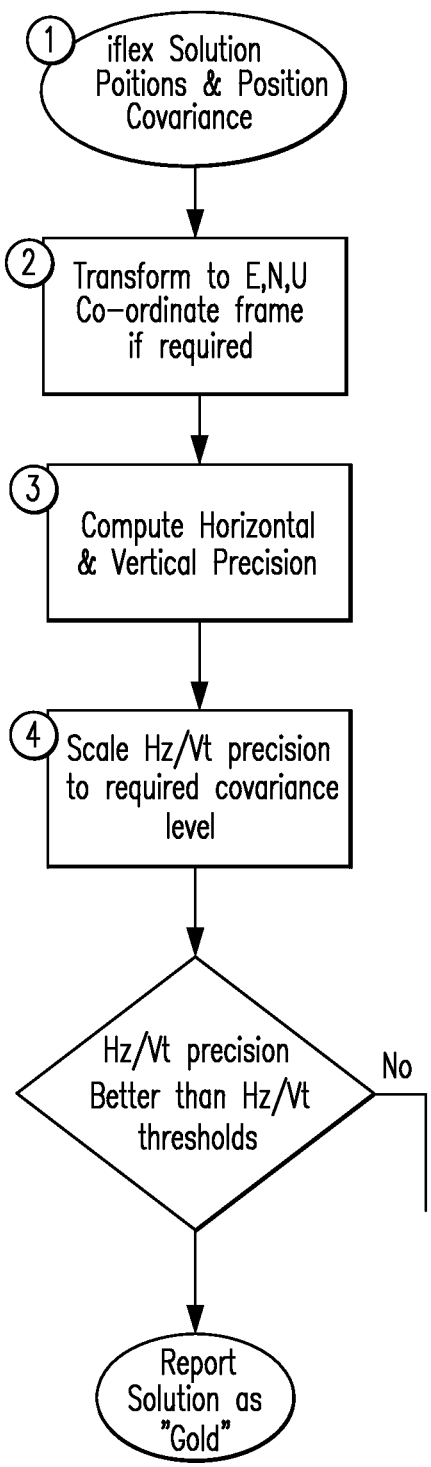
FIG. 10 shows a process for evaluating positioning precisions in accordance with some embodiments of the invention.

FIG. 10 shows an example of logic 1000 for determining an accuracy level in accordance with some embodiments. This example is given in the context of the processing techniques described in U.S. Provisional Application for Patent 61/189,382 filed 19 Aug. 2008 (TNL A-2339P) and in International Patent Application PCT/US2009/04476 filed 5 Aug. 2009 (TNL A-2339PCT), International Patent Publication WO2010/021660 dated 25 Feb. 2010, all of which are incorporated herein by this reference. See, for example, the description at pages 32-38 and FIG. 11C of WO2010/021660.

A weighted average of integer ambiguity candidates ("iFlex" solution) is used to determine a position estimate and position covariance estimates 1005. These are optionally transformed at 1010 to East, North, Up coordinate framework. Horizontal and/or vertical precisions are computed at 1015 from the covariance matrix elements.

The horizontal and/or vertical precisions are optionally scaled at 1020 to a desired confidence level, e.g., using a particular distribution such as a Fisher F distribution. The horizontal and/or vertical precisions, as optionally scaled, are compared at 1025 to determine if they exceed desired horizontal and/or vertical thresholds. If yes, the solution is reported as "good".

Figure 11:
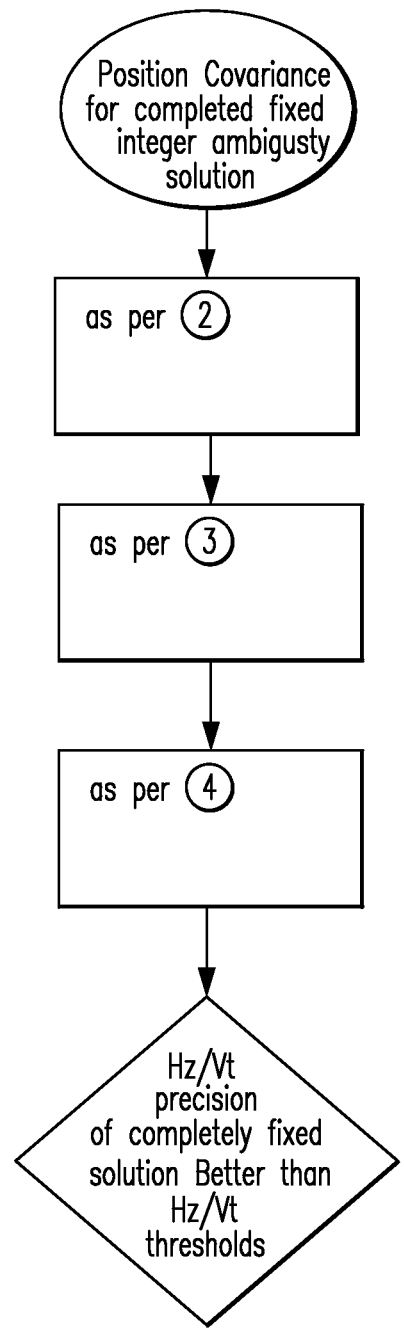
FIG. 11 shows a process for evaluating positioning precisions in accordance with some embodiments of the invention.

Covariances are also typically available in RTK processing and can be similarly used. FIG. 11 shows an example of logic 1100 for determining an accuracy level in accordance with some embodiments. This example is given in the context of RTK processing using a fixed integer ambiguity solution.

A fixed integer ambiguity set is used to determine a position estimate and position covariance estimates 1105. These are optionally transformed at 1110 to East, North, Up coordinate framework. Horizontal and/or vertical precisions are computed at 1115 from the covariance matrix elements.

The horizontal and/or vertical precisions are optionally scaled at 1120 to a desired confidence level, e.g., using a particular distribution such as a Fisher F distribution. The horizontal and/or vertical precisions, as optionally scaled, are compared at 1125 to determine if they exceed desired horizontal and/or vertical thresholds. If yes, the solution is reported as "good".

If the selected quality mode allows positioning accuracy to be compromised, the receiver's DOP (dilution of precision) mask can be raised, the C/No (carrier-to-noise ratio) mask can be lowered, and/or satellite geometry can be accepted as less than ideal. Lowering the DOP mask gives better geometry by allowing satellites at a lower elevation to be used in the position solution. Lowering the C/No mask can help when the signal is degraded for example as a satellite signal at the receiver antenna is blocked by a tree or other obstruction; in some embodiments a threshold is set so that a satellite will be dropped from the position solution when the C/No falls below a threshold.

Some embodiments use a least squares technique to DGPS with sigmas taken from the covariance matrix by taking the square roots of the diagonal elements of the covariance matrix. (A Kalman filter or other suitable processing approach may be used if desired.) Some embodiments use the same technique for corrections from an Omnistar VBS correction stream. Some embodiments use the same technique for corrections from the WAAS correction stream or other SBAS corrections stream.

Some embodiments use corrections from an Omnistar correction stream and obtain relevant sigmas from a library supplied with the Omnistar correction stream. GNSS observables and the Omnistar HP/XP/G2 correction stream are supplied to a library which provides a position estimate with covariance matrix.

Some embodiments use a lower accuracy Omnistar VBS correction stream which is processed in the same manner as DGPS correction data.

Some embodiments base DGPS accuracy or error estimates on DOP value, number of satellites tracked, and age of correction.

Figure 12:
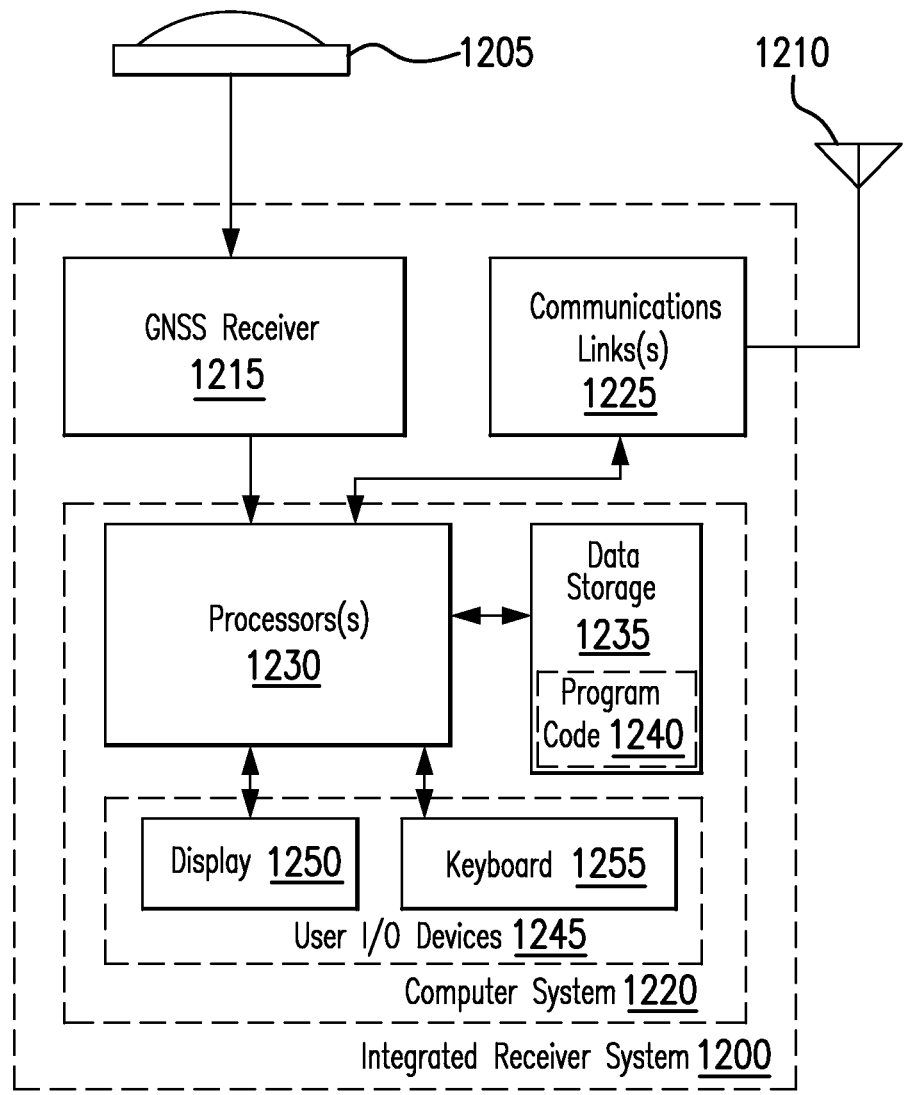
FIG. 12 is a block diagram of an integrated GNSS receiver system used in some embodiments of the invention.

FIG. 12 is a block diagram of a typical integrated GNSS receiver system 1200 with GNSS antenna 1205 and communications antenna 1210. The Trimble R8 GNSS System is an example of such a system. Receiver system 1200 can serve as a rover or base station or reference station. Receiver system 1200 includes a GNSS receiver 1215, a computer system 1220 and one or more communications links 1225. Computer system 1220 includes one or more processors 1230, one or more data storage elements 1235, program code 1240 with instructions for controlling the processor(s) 1230, and user input/output devices 1245 which may include one or more output devices 1250 such as a display or speaker or printer and one or more devices 1255 for receiving user input such as a keyboard or touch pad or mouse or microphone.

The inventive concepts can be employed in a wide variety of processes and equipment. Some exemplary embodiments will now be described. It will be understood that these are intended to illustrate rather than to limit the scope of the invention.

Those of ordinary skill in the art will realize that the detailed description of embodiments of the present invention is illustrative only and is not intended to be in any way limiting. Other embodiments of the present invention will readily suggest themselves to such skilled persons having the benefit of this disclosure.

In the interest of clarity, not all of the routine features of the implementations described herein are shown and described. It will be appreciated that in the development of any such actual implementation, numerous implementation-specific decisions must be made to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with embodiments of the present invention, the components, process steps and/or data structures may be implemented using various types of operating systems (OS), computer platforms, firmware, computer programs, computer languages and/or general-purpose machines. The methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements, such as filters and banks of filters, can be readily implemented using an object-oriented programming language such that each required filter is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented on a data processing computer such as a personal computer, workstation computer, mainframe computer, or high-performance server running an operating system such as a version of Microsoft® Windows® available from Microsoft Corporation of Redmond, Wash., or various versions of the Unix operating system such as Linux available from a number of vendors. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Following is an abbreviated summary of inventive concepts described herein:

1. A method of reporting quality of GNSS position fixes, comprising:
    obtaining a desired quality mode selection,
    obtaining position fixes with respective precision estimates and satellite tracking information,
    determining for each of a plurality of position fixes a current positioning quality based on the precision estimates and satellite tracking information and quality mode selection, and
    reporting current positioning quality.
2. The method of 1, wherein the quality selection comprises a preference of availability over accuracy, or accuracy over availability, or a balance of availability and accuracy.
3. The method of 2, wherein obtaining position fixes comprises processing GNSS receiver data subject to at least one control favoring the preference.
4. The method of 3, wherein the at least one control favoring the preference comprises at least one of: a satellite elevation mask, a C/No (Carrier-to-Noise power ratio) mask, a DOP (Dilution of Precision) mask, a control providing additional accuracy, and a control providing additional availability.
5. The method of 1, wherein the precision estimate for each position fix is determined from covariances of parameters estimated with the position fix.
6. The method of one of 1-5, wherein determining the positioning quality comprises at least one of: determining whether satellites are being tracked, determining whether a position fix is being determined, determining whether availability exceeds a threshold, determining whether availability and accuracy are balanced, and determining whether accuracy exceeds a threshold.
7. The method of one of 1-6, wherein reporting current positioning quality comprises displaying at least one of: an icon indicating current positioning quality, a color indicating current positioning quality, a number of bars indicating whether criteria corresponding to the desired quality mode selection are satisfied 8. The method of 7, wherein reporting current positioning quality comprises displaying an indication of the desired quality mode selection.

9. An article of manufacture comprising a computer-readable storage device embodying instructions which enable a processor to perform a method according to one of 1-9.

10. Apparatus for reporting quality of GNSS position fixes, comprising:
 a memory storing a desired quality mode selection,
 a memory storing position fixes with respective precision estimates and satellite tracking information,
 a processing element to determine for each of a plurality of position fixes a current positioning quality based on the precision estimates and satellite tracking information and quality mode selection, and
 a reporting element to report current positioning quality.

11. The apparatus of 10, wherein the quality selection comprises a preference of availability over accuracy, or accuracy over availability, or a balance of availability and accuracy.

12. The apparatus of 11, wherein the position fixes are determined from processing of GNSS receiver data subject to at least one control favoring the preference.

13. The apparatus of 12, wherein the at least one control favoring the preference comprises at least one of: a satellite elevation mask, a C/No (Carrier-to-Noise power ratio) mask, a DOP (Dilution of Precision) mask, a control providing additional accuracy, and a control providing additional availability.

14. The apparatus of 13, wherein the precision estimate for each position fix is determined from covariances of parameters estimated with the position fix.

15. The apparatus of one of 11-14, wherein the processing element determines the positioning quality based on at least one of: whether satellites are being tracked, whether a position fix is being determined, whether availability exceeds a threshold, whether availability and accuracy are balanced, and whether accuracy exceeds a threshold.

16. The apparatus of one of 11-15, wherein the reporting element displays at least one of: an icon indicating current positioning quality, a color indicating current positioning quality, a number of bars indicating whether criteria corresponding to the desired quality mode selection are satisfied.

17. The apparatus of 16, wherein the reporting element displays an indication of the desired quality mode selection.

The invention claimed is:

1. A method of reporting quality of GNSS position fixes, comprising:
 obtaining a desired GNSS positioning quality mode selection,
 obtaining the GNSS position fixes, each GNSS position fix including a respective precision estimate and satellite tracking information,
 determining, for each of the GNSS position fixes, a GNSS positioning quality based on the precision estimate, the satellite tracking information, and the GNSS positioning quality mode selection, and
 reporting the GNSS positioning quality.

2. The method of claim 1, wherein the GNSS positioning quality mode selection comprises a preference of availability over accuracy, or accuracy over availability, or a balance of availability and accuracy.

3. The method of claim 2, wherein obtaining the GNSS position fixes comprises processing GNSS receiver data subject to at least one control favoring the preference.

4. The method of claim 3, wherein the at least one control favoring the preference comprises at least one of: a satellite elevation mask, a C/No (Carrier-to-Noise power ratio) mask, a DOP (Dilution of Precision) mask, a control providing additional accuracy, and a control providing additional availability.

5. The method of claim 1, wherein the precision estimate for each GNSS position fix is determined from covariances of parameters estimated with the GNSS position fix.

6. The method of claim 1, wherein determining the GNSS positioning quality comprises at least one of: determining whether satellites are being tracked, determining whether a GNSS position fix is being determined, determining whether availability exceeds a threshold, determining whether availability and accuracy are balanced, and determining whether accuracy exceeds a threshold.

7. The method of claim 1, wherein reporting the GNSS positioning quality comprises displaying at least one of: an icon indicating the GNSS positioning quality, a color indicating the GNSS positioning quality, a number of bars indicating whether criteria corresponding to the desired GNSS positioning quality mode selection are satisfied.

8. The method of claim 7, wherein reporting the GNSS positioning quality comprises displaying an indication of the desired GNSS positioning quality mode selection.

9. An article of manufacture comprising a computer-readable storage device embodying instructions which enable a processor to perform the method according to claim 1.

10. Apparatus for reporting quality of GNSS position fixes, comprising:
 a memory storing a desired GNSS positioning quality mode selection,
 a memory storing the GNSS position fixes, each GNSS position fix including a respective precision estimate and satellite tracking information,
 a processing element to determine, for each of the GNSS position fixes, a GNSS positioning quality based on the precision estimate, the satellite tracking information, and the GNSS positioning quality mode selection, and
 a reporting element to report the GNSS positioning quality.

11. The apparatus of claim 10, wherein the GNSS positioning quality mode selection comprises a preference of availability over accuracy, or accuracy over availability, or a balance of availability and accuracy.

12. The apparatus of claim 11, wherein the GNSS position fixes are determined from processing of GNSS receiver data subject to at least one control favoring the preference.

13. The apparatus of claim 12, wherein the at least one control favoring the preference comprises at least one of: a satellite elevation mask, a C/No (Carrier-to-Noise power ratio) mask, a DOP (Dilution of Precision) mask, a control providing additional accuracy, and a control providing additional availability.

14. An apparatus for reporting quality of GNSS position fixes, comprising:
 a memory storing a desired quality mode selection,
 a memory storing position fixes with respective precision estimates and satellite tracking information,
 a processing element to determine for each of a plurality of position fixes a current positioning quality based on the precision estimates and satellite tracking information and quality mode selection, and a reporting element to report current positioning quality, wherein the quality selection comprises a preference of availability over accuracy, or accuracy over availability, or a balance of availability and accuracy, wherein the position fixes are determined from processing of GNSS receiver data subject to at least one control favoring the preference, wherein the position fixes are determined from processing of GNSS receiver data subject to at least one control favoring the preference, wherein the at least one control favoring the preference comprises at least one of: a satellite elevation mask, a C/No (Carrier-to-Noise power ratio) mask, a DOP (Dilution of Precision) mask, a control providing additional accuracy, and a control providing additional availability, and wherein the precision estimate for each position fix is determined from covariances of parameters estimated with the position fix.

15. The apparatus of claim 10, wherein the processing element determines the GNSS positioning quality based on at least one of: whether satellites are being tracked, whether a GNSS position fix is being determined, whether availability exceeds a threshold, whether availability and accuracy are balanced, and whether accuracy exceeds a threshold.

16. The apparatus of claim 10, wherein the reporting element displays at least one of: an icon indicating the GNSS positioning quality, a color indicating the GNSS positioning quality, a number of bars indicating whether criteria corresponding to the desired GNSS positioning quality mode selection are satisfied.

17. The apparatus of claim 16, wherein the reporting element displays an indication of the desired GNSS positioning quality mode selection.

* * * * *